United States Patent [19]
Buchheit

[11] 3,749,374
[45] July 31, 1973

[54] SCREW EXTRUDER FOR THE TREATMENT OF PULVERIZED MATERIAL

[75] Inventor: Dieter Buchheit, Ditzingen, Germany

[73] Assignee: Werener & Pfleiderer, Stuttgart-Feuerbach, Germany

[22] Filed: Dec. 6, 1971

[21] Appl. No.: 205,126

[30] Foreign Application Priority Data
Dec. 10, 1970 Germany................ P 20 60 706.1

[52] U.S. Cl................................ 259/192, 259/104
[51] Int. Cl................................................. B01f 7/08
[58] Field of Search.................... 259/191, 192, 104, 259/5, 6, 21, 40, 41

[56] References Cited
UNITED STATES PATENTS

| | | | |
|---|---|---|---|
| 2,733,051 | 1/1956 | Street................................ | 259/192 |
| 2,820,618 | 1/1958 | Bolling............................... | 259/104 |
| 3,132,739 | 5/1964 | Jakobsson......................... | 259/104 |
| 2,570,864 | 10/1951 | Rowlson............................ | 259/104 |

Primary Examiner—Robert W. Jenkins
Attorney—Frederick E. Hane et al.

[57] ABSTRACT

A screw extruder particularly for the treatment of pulverized material comprises an elongate casing including a feed portion and a treatment portion. A main screw extending along the length of the casing is rotatably mounted in the same and a short auxiliary screw is rotatably mounted in the feed portion of the casing parallel with the main screw but not in mesh with the same. Each of the screws is driven by its own drive means and the rotational speed of the auxiliary screw can be varied independently of the rotational speed of the main screw.

7 Claims, 2 Drawing Figures

FIG. I

SCREW EXTRUDER FOR THE TREATMENT OF PULVERIZED MATERIAL

The invention relates to a one-screw screw extruder and particularly to a screw extruder for treating materials fed to the extruder in pulverized form.

BACKGROUND

With all one-screw screw extruders of the general kind above referred to, as heretofore known, one of the continuously occurring problems is to avoid overfeeding or underfeeding of the extruder, if and when different materials are to be treated in the extruder. This problem is particularly prevalent when the pulverized materials to be treated have a poor fluidity causing different weights of the material per volume unit. Such changes in weight for a given unit of volume are present for instance with many types of pulverized synthetic plastic material to be processed in the extruder.

It is known to provide in a one-screw screw extruder in which the screw extends through the length of the extruder casing, a short auxiliary screw in the feed portion of the casing. However, arrangements of this kind as now known have not been fully successful for reasons which will be more fully explained hereinafter.

Other known arrangements for avoiding overfeeding or underfeeding of the extruder when the material to be processed is changed, are to increase the depths or the pitch of the screw turns in the feed portion of the extruder in relation to the depths of the pitch of the turns in the treatment portion of the extruder. Such changes in depth and pitch have been found to be successful only in very few situations. Moreover, as it is obvious, increase of the depths of the screw turns causes a corresponding decrease of the cross-section of the screw shaft and thus a proportional decrease of the acceptable torsion moment. Increase of the pitch causes a corresponding decrease of the filling capacity of the extruder and of its conveying efficiency.

It is also known to provide so-called feed rollers. However, such rollers have inherently never the conveying and mixing capability of screw elements and can hence be used only in few instances and for highly specialized treatment purposes.

As to the use of the aforementioned auxiliary screw in the feed portion of a one-screw screw extruder, various attempts have been made to obtain a fully satisfactory operation of extruders equipped with such auxiliary screw but so far without success. There are known extruders in which the auxiliary screw is in mesh with the main screw and extruders in which the two screws are not in mesh. It is also known to mount the auxiliary screw not parallel to the main screw as it is customary but at an acute angle with reference thereto. All the arrangements using an auxiliary screw as heretofore known have in common that the rotational speed of the auxiliary screw is at a fixed ratio with the rotational speed of the main screw.

Such fixed relationship of the rotational speeds of the two screws entails several and significant disadvantages. If the material to be processed requires a high power output, the feed to the extruder can become so high that the acceptable torsional moment of the main screw is exceeded. Such overloading of the main screw may cause severe mechanical damage to the machine or if the machine is equipped with overload safeguards, at least a stoppage of the power drive of the machine and thus an interruption of the treatment operation will occur. Such interruption results with many materials in a serious deterioration thereof. Conversely if the material to be processed requires a low power output, the safely acceptable torsional moment of the main screw of the extruder will not be fully utilized so that the extruder is uneconomically operated.

Other important disadvantages of the aforedescribed screw extruders with auxiliary screw and fixed relationship between the rotational speeds of the two screws are that if the extruder is overfed, the material to be processed is pushed from the feed end of the extruder to the discharge end thereof rather than truly conveyed by the screw turns of the extruder. Such "pushing" of the material causes a down grading of the mixing and homogenizing action of the extruder. If the material to be processed has a very poor fluidity and hence the actual weight of the material per a given volume unit is low, the filling capacity of the main screw of the extruder is not utilized and as a result a pulsating discharge of the material occurs. Such pulsating discharge of material causes in many cases considerable deterioration of the finished product, especially if for instance the material discharged from the extruder is to be used to produce articles having thin walls.

THE INVENTION

It is a broad object of the invention to provide a novel and improved extruder of the general kind above referred in which for any required type of treatment and for any kind of material to be processed, optimal feeding can be conveniently obtained so that overfeeding or underfeeding of the extruder is avoided.

A more specific object of the invention is to provide a novel and improved extruder of the general kind above referred to, in which the operation of the extruder can be adapted to the material fed to the extruder in accordance with its specific requirements of the material without stopping the extruder and without changing the rotational speed of its main screw.

SUMMARY OF THE INVENTION

The afore pointed out objects, features and advantages and other objects, features and advantages which will be pointed out hereinafter and are set forth in the appended claims are obtained by providing in the feed portion of the extruder casing, an auxiliary screw which is driven by a drive means that is independent of the drive means driving the main screw of the extruder and the rotational speed of which can be varied independently of the rotational speed of the main screw.

Such independent control of the speeds of the two screws permits an adaption of the rotational speed of the auxiliary screws so that the feed to the main screw can be selected in accordance with the specific requirements of the material and be changed if necessary at any time during the operation of the extruder. No change in the rotational speed of the main screw is necessary to assure continuous full feeding of the material to the same.

As has been pointed out before, the weight of a given unit of volume of pulverized material tends to vary considerably. Such changes in weight may be caused during and due to the production of the material to be treated in the extruder, or it may also be caused by the conditions at which the pulverized material is stored and the humidity to which the material is exposed while it is stored.

The arrangement of the extruder according to the invention permits compensation for all changes in the weight per volume unit when and while the processing of the material in the extruder is in progress thereby assuring a uniform feeding of the extruder and thus a uniform end product. The possibility of compensating for changes in the weight of the material per volume unit without interruption of the operation of the extruder is in practice of very great importance as frequently differences in weight per volume unit are discovered only during operation.

According to a further aspect of the invention, the auxiliary screw is rotatably mounted in tangential relationship with the main screw, that is just without meshing of the two screws. It has been found that mounting of the two screws is such tangential relationship results in a particularly high efficiency of the screws.

According to another aspect of the invention, the distance between the apices of the turns of the main screw and of the auxiliary screw which latter is axially parallel to the main screw is so selected that it is larger than the maximal acceptable manufacturing tolerance between the turns of tangentially coacting screws.

The drive means for the auximilary screw is preferably a reversible motor. The rotational speed of the auxiliary screw is advantageously gradually variable rather than step wise. Such gradual adjustment of the speed of this screw such that the main screw always operates with an optimal filling capacity even if the adjustment has to be made during the operation.

Optimal operation of the main screw and thus of the extruder can be conveniently obtained by slowly increasing the rotational speed of the auxiliary screw until a speed level is reached just below overloading the main drive of the extruder.

Pitch, flight direction of the turns, depth of the turns, the multiplicity of the screw turns and the diameters of the main screw and the auxiliary screw can be selected as desired and suitable for a specific construction.

DETAILED DESCRIPTION OF AN EMBODIMENT OF THE INVENTION

Figure 1:
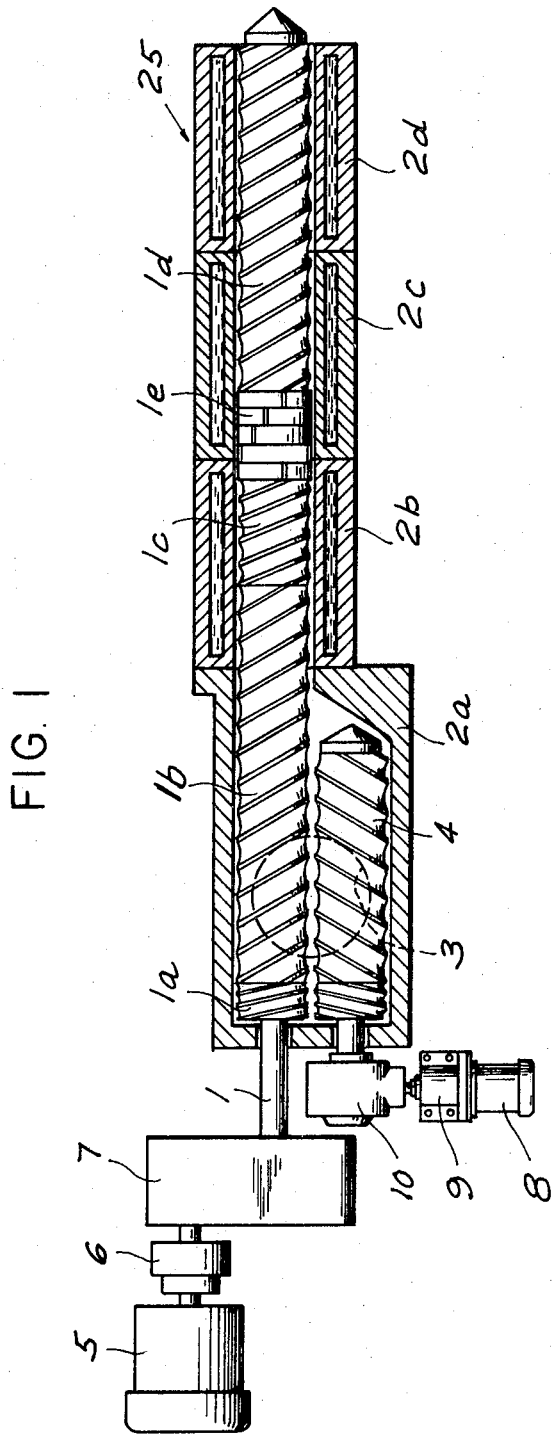

In the accompanying drawing, a preferred embodiment of the invention is shown by way of illustration and not by way of limitation.

Figure 2:
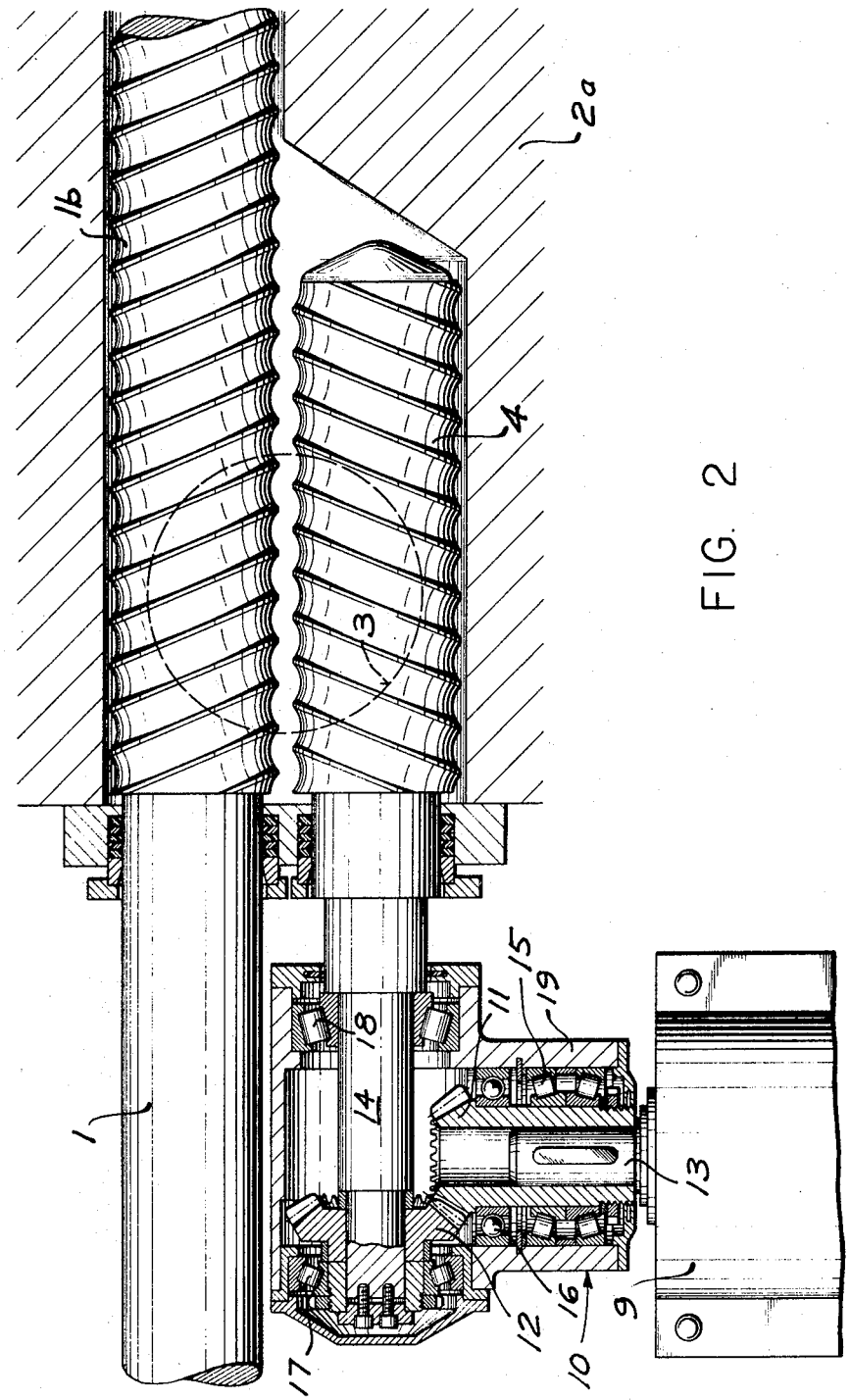

In the drawing:

FIG. 1 is a lengthwise plan view, partly in section, of an extruder according to the invention; and FIG. 2 is a slightly modified fragmentary view of the feed portion side of the extruder, partly in section and on an enlarged scale.

Referring now to the figures more in detail, the exemplified extruder comprises a main screw 1 which is composed of a plurality of screw elements 1a, 1b, 1c and 1d. As clearly shown in FIG. 1, the screw elements have different pitches which are selected in accordance with the progress of the treatment in the casing 25. Kneading discs 1e are interposed between screw elements 1c and 1d. The main screw is rotatably mounted in the casing which may be composed of several sections, sections 2a, 2b, 2c and 2d being shown. Section 2a constitutes the feed portion of the casing and the remaining sections the treatment portion. The main screw extends through both portions. As is clearly shown in FIG. 1, feed portion 2a is wider than the other sections of the casing to accommodate therein an auxiliary screw 4 which is disposed parallel to the main screw.

The material to be treated in the extruder such as pulverized material is fed into the casing through an inlet port diagrammatically indicated by circle 3 and is discharged from the casing at the other end of screw 1. The feeding and the discharge assemblies of the extruder do not constitute part of the invention and should be visualized as being conventional. Moreover, the extruder may be equipped with other conventional components such degassing ports or ports for adding additives while the material is passing through the casing.

The shaft of main screw 1 is driven by a motor 5 via a coupling 6 and a gearing 7. The auxiliary screw 4 is driven by a motor 8 via a gearing 9 and a second gearing 10. As it is clearly shown, the driving assemblies for the two screws are separate and independent of each other. Both motors or only motor 8 for screw 4 may be electric motors or other motors such as hydraulic motors. Both motors, but at least the motor for driving the auxiliary screw are preferably speed variable and also reversible. Speed variable and/or reversible motors are widely known and readily available in the market. The specific structure of the motors does not constitute part of the invention.

Gearing 9 included in the drive train for the auxiliary screw is a gearing the transmission ratio of which is variable, preferably gradually. There are widely known and readily available in the market many suitable types of gearings the transmission ratio of which is stepwise or gradually adjustable. The invention is not concerned with the specific structure of gearing 9 but only that it is capable of performing the afore outlined operations.

As it is best shown in FIG. 2, gearing 10 comprises two bevel or conical gears 11 and 12. Gearing 11 is mounted on output shaft 13 of gearing 9 and gear 12 on shaft 14 of auxiliary screw 4. The two gears are in mesh for transmitting the rotations of shaft 13 to shaft 14. Gearing 10 further comprises a self-aligning roller bearing 15, a ball bearing 16, a roller bearing 17 and a roller bearing 18. All these bearings and also the gears are mounted in a housing 19. The specific arrangement and construction of the bearings should be assumed to be conventional.

As is clearly shown in the figures, the screws 1 and 4 are not in mesh but in tangential relationship. With such tangential relationship of the two screws, the usual and industrially generally accepted standard tolerance between the apices of the screw turns is about 0.5 mm to 1 mm. If the material to be treated contains much air or gas it is advantageous to increase the distance or gap 20 between the apices of the turns to about 4 to 6 mm.

The material within the casing is automatically strongly compacted at the inner end of the auxiliary screw 4. The gas or air squeezed out of the material by such compression can readily escape through gap 20 and feed port 3.

While this invention has been described in detail with respect to a certain now preferred example and embodiment of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A single screw extruder for processing melts of synthetic plastic material and synthetic plastic materials in powder or granulated form, said screw extruder comprising in combination:
    an elongate casing having at one end a feed zone including a feed port and at the other end a discharge port;
    a long main conveyor screw rotatably mounted in said casing and extending through substantially the length thereof, said screw and casing defining adjacent to the feed port a feed-in zone, the remaining lengths of the casing and the screw constituting a treatment zone;
    a short auxiliary screw rotatably mounted in said casing and terminating at the end of the feed-in zone as defined by the screw and the casing, said screws being disposed in axially parallel but non-meshing relationship with each other;
    a first drive means coupled with the main screw for rotating the same;
    a second drive means coupled with the auxiliary screw for rotating the same; and
    transmission means interposed between the second drive means and the auxiliary screw, the transmission ratio of said transmission means being variable for varying the rotational speed of the auxiliary screw independently of the rotational speed of the main screw.

2. The screw extruder according to claim 1, wherein said transmission means comprise a variable gearing.

3. The screw extruder according to claim 1, wherein said speed variable gearing is a gradually speed adjustable gearing.

4. The screw extruder according to claim 1 wherein said second drive means is a reversible motor.

5. The screw extruder according to claim 1, wherein the main screw and the auxiliary screw are disposed in tangential relationship.

6. The screw extruder according to claim 5 wherein the distance between the apices of the screw turns of the screws is larger than the manufacturing tolerance spacing of 1 mm between said apices.

7. The screw extruder according to claim 6, wherein said distance between the apices of the screw turns is between 4 to 6 mm.

* * * * *